United States Patent [19]
Dorner

[11] 3,863,410
[45] Feb. 4, 1975

[54] PRESSURE-TIGHT REACTOR TANK
[75] Inventor: Heinrich Dorner, Erlangen, Germany
[73] Assignee: Siemens Aktiengesellschaft, Munich, Germany
[22] Filed: Dec. 18, 1972
[21] Appl. No.: 315,867

[30] Foreign Application Priority Data
Dec. 23, 1971  Germany............................ 2164127

[52] U.S. Cl..................................... 52/249, 220/3
[51] Int. Cl............................................ G21c 13/00
[58] Field of Search .......... 52/224, 248, 249; 220/3

[56] References Cited
UNITED STATES PATENTS
3,443,631  5/1969  Bremer et al...................... 52/224 X
3,503,171  3/1970  Frohly................................. 52/224
3,568,379  3/1971  Johnsson et al. ................. 52/224 X
3,683,574  8/1972  Vaessen................................ 52/224
3,734,827  5/1973  Schilling .............................. 220/3 X Primary Examiner—Frank L. Abbott
Assistant Examiner—Carl D. Friedman
Attorney, Agent, or Firm—Kenyon & Kenyon Reilly Carr & Chapin

[57]  ABSTRACT

The pressure-tight tank of this invention for nuclear reactors consists of a pressure-tight steel tank and a concrete cylinder surrounding the steel tank. The pressure-tight steel tank includes, as separate parts, at least two cylindrical boiler-shells, which are pressure-tight in a radial direction, and a bottom, which is preferably flat. The pressure-tight tank of this invention also includes a concrete cylinder surrounding the steel tank. The concrete cylinder aids in pressing the separate parts of the steel tank together pressure-tightly in the axial direction. Pressure-applying elements apply force against an inwardly-domed cover over the steel tank which presses the separate parts of the steel tank together.

7 Claims, 2 Drawing Figures

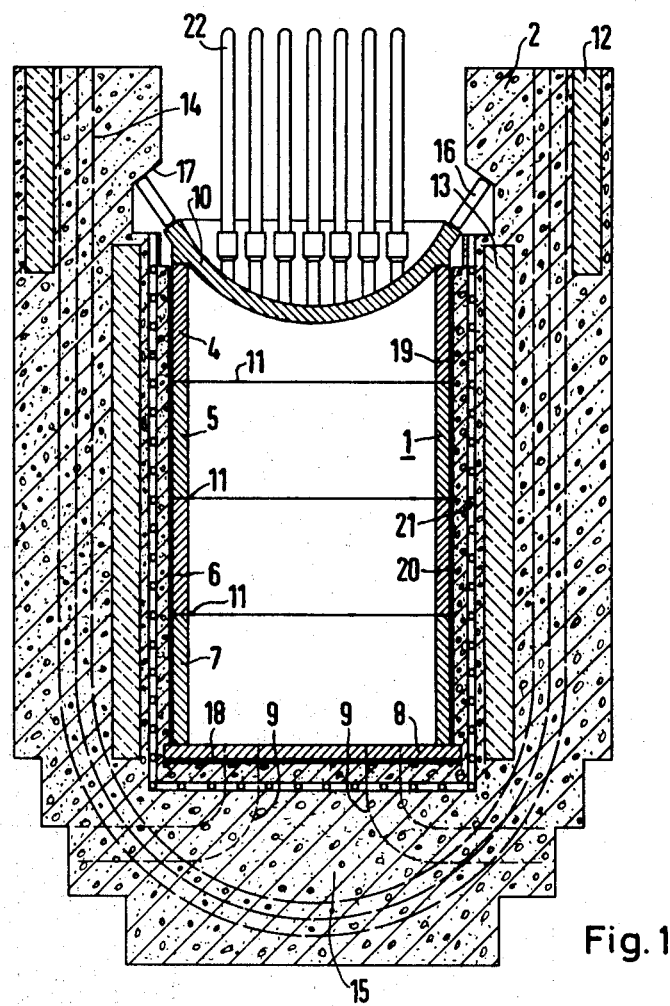
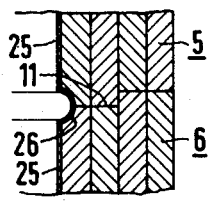
Fig. 1
Fig. 2

PRESSURE-TIGHT REACTOR TANK

BACKGROUND OF THE INVENTION

1. Field of the Invention

This invention relates to the field of nuclear reactors and more particularly to a pressure-tight steel tank for a nuclear reactor.

2. Description of the Prior Art

It is known how to make the pressure tanks of nuclear reactors as pressure-tight steel tanks. But, the cost is very great, particularly in the case of high performance tanks. One limitation is that these large and heavy steel tanks cannot be transported as a single piece. As a result, expensive installation is necessary at the site, with thick-wall welds.

Attempts have been made to use reinforced-concrete tanks, made at the place of installation, as reactor pressure-tight tanks. Up to the present time, however, a satisfactory arrangement has not been achieved, because the concrete is not suited to the high temperatures occurring during operation. Also, a satisfactory insulation has also not been found. Furthermore, it has not been possible to solve the problem by providing metal linings for the reinforced-concrete tanks because these metal linings are not pressure-tight and do not provide insulation against the different heat-expansion of the concrete.

The pressure-tight steel tanks of nuclear reactors are usually surrounded by a concrete cylinder, which acts chiefly as a biological shield. Such a concrete cylinder does not bear very much mechanical stress and does not contribute to the pressure-tightness of the steel tank. Other proposals that provide a concrete structure around the steel tank as a safety device in the event that the steel tank bursts also involve high cost, because both the steel tank and also its surrounding concrete structure have to be dimensioned for the greatest pressures and forces possible in reactors and for flying fragments of the steel tank.

SUMMARY OF THE INVENTION

The purpose of this invention is to provide a simple and economical pressure-tight tank for nuclear reactors.

The pressure-tight tank of this invention for nuclear reactors consists of a pressure-tight steel tank and a concrete cylinder surrounding the steel tank. The pressure-tight steel tank includes, as separate parts, at least two cylindrical boiler-shells, which are pressure-tight in a radial direction, and a bottom, which is preferably flat. The pressure-tight tank of this invention also includes a concrete cylinder surrounding the steel tank. The concrete cylinder aids in pressing the separate parts of the steel tank together pressure-tightly in the axial direction.

According to this invention, the steel tank is of itself pressure-tight in the peripheral direction. As a result, the concrete cylinder is not greatly stressed by the coolant present in the reactor. This is in contrast to the known pressure-tight tanks of concrete which merely have a metal lining that is not pressure-tight. The clearance between the cylindrical boiler-shells, which are steel rings, and the concrete cylinder surrounding the steel tank can be limited to 3 to 5 thousandths of the diameter of the cylindrical boiler-shells. In the event that a boiler-shell bursts, the burst is controlled by the concrete and the outflow cross-section remains minimal.

The concrete cylinder aids in pressing together the separate parts of the steel tank in the axial direction, i.e., the boiler-shells and the tank bottom. Therefore, the steel tank can be made considerably simpler and cheaper. For example, the boiler-shells can be made in a number of layers, whereby a sealing weld is provided only where the rings of the cylindrical boiler-shells abut one another. This multiple layer arrangement increases safety substantially, because it is possible to count on only one layer becoming fractured, while the tank as a whole cannot burst. The metal boiler-shells may be made as wound container rings or as forged rings. The multiple layers may be made of different materials. It is advantageous to make the inner layer of a steel which is particularly resistant to corrosion.

The separate parts of the steel tank are also pressed tightly together by pressure-applying elements with the aid of an inwardly curved or domed cover. In this way, a separate, supplementary cover is eliminated. The curve eliminates tensile stresses in the cover, so that a crack cannot lead to a burst. Thus, the reactor tank is almost completely safe against bursting.

In accordance with this invention, all the essential coolant piping can be run through the bottom of the steel tank. The boiler-shells, which in accordance with the invention are combined into a pressure-tight reactor tank, have no connecting coolant piping. As a result, they are made in a simple manner and can be clamped together. The preferred form of construction for this invention includes a flat plate as the tank bottom. This also facilitates the connections between the steel tank and the coolant pipes. In addition, the forces exerted on the tank are better controlled.

The concrete cylinder has an annular reinforcement in the region of the steel tank. Even though this annular reinforcement may have small dimensions, it has the necessary strength in the region of the steel tank. The concrete cylinder may be connected with the concrete bottom, upon which the bottom of the steel tank rests, by means of an axial reinforcement of U-shaped cross-section. It is also advantageous to provide a slippery layer between the bottom of the steel tank and the concrete bottom. Between the steel tank and the surrounding reinforced-concrete cylinder, it is desirable to provide an insulating layer of concrete, which is preferably cooled and which keeps heat stresses away from the mechanically-loaded concrete cylinder.

DESCRIPTION OF THE DRAWINGS

FIG. 1 is a vertical cross-section of a pressure-tight reactor tank of this invention.

FIG. 2 is an enlarged view of a portion of FIG. 1 showing a cross-section of a portion of the boiler-shells in greater detail.

DETAILED DESCRIPTION

Referring to FIG. 1, the pressure-tight reactor tank of this invention consists of a pressure-tight steel tank 1 and a reinforced-concrete cylinder 2 which surrounds the steel tank 1. In this embodiment, the steel tank includes, as separate parts, four similar cylindrical boiler-shells 4, 5, 6 and 7. Other embodiments may have a greater or lesser number of boiler-shells. The boiler-shells 4, 5, 6 and 7 are dimensioned to resist forces acting in a radial direction and the boiler-shells 4, 5, 6 and

3

7 are pressure-tight in the radial direction. The boiler-shells 4, 5, 6 and 7 may be made of forged rings or may be made of multilayer wound rings of boiler steel.

Referring to FIG. 2, the boiler-shells 4, 5, 6 and 7 may have a supplementary inner layer 25 of austenitic steel. A sealing weld is only provided on this inner layer 25, with the welded seam being in the region of a rounded hollow channel 26 at the junction points 11 between the individual boiler-shells 4, 5, 6 and 7.

Referring to FIG. 1, the bottom 8 of the steel tank 1 is a flat steel plate, which may also be made advantageously in a number of layers, the inner layer of the bottom 8 being made of austenitic steel. This austenitic layer on tank bottom 8 is welded to the austenitic layer 25 (FIG. 2) of the boiler-shells 4, 5, 6 and 7. The pipes 9 for the coolant, which are shown by dashed lines in FIG. 1, are set in the flat tank bottom 8. The pipes 9 penetrate and are firmly affixed to tank bottom 8 (e.g. they are screwed in and seal-welded).

The top closure of the steel tank 1 is a cover 10, made as a forged part or from a number of sheet-metal segments. The cover 10 is domed-shaped inwardly, so that no tensile stresses can occur in it.

The reinforced-concrete cylinder 2 has two annular reinforcements 12 and 13. The concrete cylinder 2 also has an axial reinforcement 14 in the shape of a U which runs through the bottom 15 of the reinforced-concrete cylinder 2. This provides good anchorage between the concrete cylinder 2 and the concrete bottom 15, upon which the steel plate tank bottom 8 is supported. There is a slippery layer 18, consisting for example of graphite plates or of graphite-covered procelain plates, between tank bottom 8 and the bottom 15 of the concrete cylinder 2. The separate parts of the steel tank 1 can be pressed together by the aid of pressure-applying elements 16 that are arranged between and bear against the interior shoulder 17 at the top of the reinforced-concrete cylinder 2 and the inwardly-domed cover 10. This produces a pressure-tight steel tank 1. Because of an annular gap 19 between the concrete cylinder 2 and the boiler-shells 4, 5, 6 and 7, the concrete cylinder 2 in normal operation does not have to take any radial forces. Even with a maximum expansion resulting from heat, such a spacing is insured by the annular gap 19. The annular gap 19 should not be less than 3/1000 to 5/1000 of the diameter of the boiler-shells 4, 5, 6 and 7. The annular reinforcement 12 is needed only because the concrete cylinder 2 is intended to serve as a safety container in the event of a break in the steel tank 1.

The inside of the reinforced-concrete cylinder 2 adjacent to the steel tank 1 is provided with a layer 20 of insulating concrete. At the outside of this layer 20, between the insulating concrete layer 20 and the reinforced concrete cylinder 2, there is a cooling means 21 provided, which is made either as a tubular coil for water-cooling, or as a gap for air-cooling.

Guide tubes 22 for the control rods are set in the tank cover 10. Because the coolant pipes 9 are disposed at the bottom 8 of the steel tank, the boiler-shells 4, 5, 6 and 7 do not have any coolant conductors, etc.

The pressure-applying elements 16 are made so that they can be elongated hydraulically. In this way, force can be applied against the cover 10, and this force presses together the steel tank 1 and also produces the necessary force for sealing the cover 10.

4

This invention has been described using a reinforced-concrete cylinder 2. Other embodiments may use another method of strengthening the concrete cylinder, by means of which the concrete cylinder 2 is able to take the forces needed for axial pressure-tightness of the steel tank 1.

What is claimed is:

1. A nuclear reactor pressure tank having a cylindrical steel wall and a concrete wall surrounding this steel wall; wherein the improvement comprises said steel wall being formed by a plurality of cylindrical steel rings each of which has a cylindrical wall having opposite ends and strong enough in the radial direction to be pressure-tight with respect to the reactor internal pressure, said rings being stacked with mutually adjacent pairs of their said ends in abutting relationship to form said cylindrical steel wall, one of said rings forming a lowermost ring with one of its said ends forming a bottom end, a substantially flat steel bottom wall supporting said lowermost ring's said bottom end, said concrete wall being formed by concrete forming a cylindrical wall encircling said cylindrical steel wall and radially spaced at least slightly from the latter, said concrete further forming a bottom concrete wall beneath said steel bottom wall, another of said steel rings forming an uppermost ring with one of its said ends forming a top end, said cylindrical concrete wall having a portion extending upwardly to a level above said top end, a steel cover for said top end and resting thereon, and means between said concrete wall's upper portion and said cover for creating pressure therebetween so that said cover presses downwardly on said top end of said uppermost steel ring, holding all of said rings axially pressed together and towards and on said steel bottom wall.

2. The tank of claim 1 in which said steel cover has an inwardly domed shape and a peripheral edge, said concrete wall's said upper portion forms an interior shoulder above said peripheral edge, and said means being elongated and extending between said peripheral edge and said internal shoulder.

3. The tank of claim 1 in which said cylindrical steel wall and said concrete wall are radially interspaced to form an annular gap which is from 0.003 to 0.005 of the diameter of said steel wall.

4. The tank of claim 1 in which said rings are made of multilayers of steel comprising an inner layer of austenitic steel on which layers of boiler steel are superimposed and having said inner layers interwelded at said ends in abutting relationship, and said flat steel bottom wall has an inner layer of austenitic steel interwelded to one of the aforesaid austenitic layers of one of said rings.

5. The tank of claim 1 in which said rings are forged rings.

6. The tank of claim 1 in which said flat steel bottom wall and said concrete bottom wall have holes formed therethrough and coolant pipes are fixed in said holes in said steel bottom wall.

7. The tank of claim 1 in which an inverted U-shaped reinforcement extends axially through said concrete cylindrical wall and said bottom concrete wall and a slippery layer is interposed between said steel bottom wall and said concrete bottom wall.

* * * * *